Aug. 22, 1950  H. J. FINDLEY  2,519,449
MAGNETIC DRIVE

Filed June 4, 1949  4 Sheets-Sheet 1

INVENTOR.
Howard J. Findley.
BY
Harness, Dickey & Pierce
ATTORNEYS.

Patented Aug. 22, 1950

2,519,449

UNITED STATES PATENT OFFICE 2,519,449

MAGNETIC DRIVE

Howard J. Findley, Chardon, Ohio, assignor to Eaton Manufacturing Company, Cleveland, Ohio, a corporation of Ohio Application June 4, 1949, Serial No. 97,269

15 Claims. (Cl. 192—84)

This invention relates generally to magnetic drives, and more particularly to magnetic clutches for controllably coupling two members together and is particularly adapted, among other uses, as a magnetic clutch for coupling a prime mover to a rotatable load whereby the rotation of the load may be controlled. This application is a continuation-in-part of applicant's copending but now abandoned application, Serial No. 38,543, filed July 13, 1948.

Objects of this invention are to provide such a magnetic clutch having improved operating characteristics; to provide such a clutch which will drive the driven member in synchronism with the driving member, will permit of nonsynchronous drive between the members and will permit one of the members to move freely with respect to the other; to provide such improved characteristics by the addition of a bonding material comprising a quantity of finely divided magnetic material and a quantity of finely divided solid lubricant; to provide a magnetic clutch having the foregoing characteristics and further arranged to provide a torque which under one condition of excitation and loading is a combination of the electro-mechanical effect of the bonding material and of the eddy current effect of the flux and at other excitations and loads the torque developed is entirely a consequence of electromechanical effect; to provide such a high torque clutch which has a low no-load drag; to provide such structures wherein centrifugal forces acting upon the bonding material serve to maintain it in the air gap regions, in readiness to establish the bond between the relatively movable clutch elements; and to generally improve magnetic drives of the character described.

Referring to the drawings:

Fig. 8 is a view in vertical transverse section of a structure similar to that of Figures 1 through 5, but incorporating means to provide the field member with a smooth periphery;

Fig. 9 is a view in axial section of a further modification of the invention corresponding generally to that of Figures 1 through 5, but differing therefrom primarily in that the field member is not circumferentially polarized;

In accordance with the broader aspects of the present invention, it may be applied to a wide variety of magnetic clutch constructions, which constructions may be generically classified as including a plurality of relatively movable (and in most cases relatively rotatable) members formed at least in part of magnetic material and so arranged as to receive between adjacent faces thereof a quantity of the hereinafter described bonding material. When energized, the bonding material appears to provide a magnetically established electromechanical bond between the two members which, within certain torque limits, causes the members to move synchronously and, beyond these torque limits, permits a slipping movement between the driving and the driven ones of the members.

Within the purview of the invention, the members themselves may be variously constructed, the resultant torque may be due entirely or in part to the aforesaid bond, the excitation may be variously applied, and may be either intermittent or continuous, and the members may interchangeably serve as driven or driving members. To illustrate the wide adaptability of the invention, and the wide variety of structures which may embody it, a number of different clutch structures are disclosed herein, in an illustrative and not in a limiting sense.

The magnetic clutch or drive unit 1 of Figs. 1 through 5 is, except as disclosed below, of a usual construction of the so-called eddy current type in the air gap region of which has been placed a quantity of fine magnetic particles of the order of 8 microns in diameter, and a quantity of a solid dry powdered lubricant such as graphite, mica, soapstone, potstone, steatite, French chalk, lampblack, and so forth, or mixture thereof. The presence of the magnetic particles in the air gap tremendously increases the torque which may be transmitted by a unit of given size. The use of the dry lubricant permits the operation of the unit under slip conditions without undue internal losses and particularly at non-excited or no-load conditions permits full slip without an appreciable frictional drag. The addition of this powdered mixture permits synchronous rotation of the rotor 2 and the drum 8 of the unit 1 in which condition there is no eddy current driving effect between the two members and the sole driving effect appears to be that produced as a result of the presence of the magnetic material in the air gap. It further permits operating under slip conditions in which the dry lubricant prevents undue abrasion and wearing of the unit, and no-load or non-excited operation with full slip in which the dry lubricant and magnetic particles offer little if any resistance to relative rotation of the rotor 2 and drum 8.

The exact theory of the action of these materials, defined below as bonding materials, is not known with absolute certainty, but the results are definite and positive. It is believed that the presence of this powdered material in the coupling acts, under energized conditions, to provide pillars or columns lying in the flux paths and which are formed and held together by the flux flowing in such paths between the magnetic poles of the rotor 2 and the drum 8, so that the drum 8 is connected mechanically and frictionally to the rotor 2 by means of such columns. Under de-energized conditions of the coupling now being described, the components of the bonding material have complete freedom of movement and so do not cause a drag between the two relatively movable parts of the coupling.

Throughout this specification and claims the term "powdered bonding material" is used as comprising several different materials, one having magnetic characteristics such as iron and another having lubricating but substantially non-cohesive characteristics such as the solid lubricants mentioned above, or mixtures of the lubricants. In the presently preferred embodiments of the invention, a preferred magnetic material is that known commercially as Carbonyl E and a preferred solid lubricant is powdered graphite. As aforesaid, Carbonyl E has a grain size of about 8 microns, and the graphite may be of the order of 200 mesh.

Different operating conditions determine the most preferable ratio between the weight of magnetic particles and the particles of solid lubricant. For example, excellent results have been obtained with structures of the type disclosed in Figs. 1 through 5, using a 50-50 mixture, as measured by volume, of Carbonyl E and graphite. The mesh of the lubricant may vary between wide limits but experimental results with the various structures disclosed herein indicate that the finer the powder the better the obtained results. Mixtures containing a higher percentage of graphite than that given above have been used with good results. Similarly, in all cases, various factors determine the optimum quantity of powdered mixture in relation to the size of the magnetic drive and particularly to the volume of the air gap. Generally speaking, it is preferred to use a volume of powdered mixture which is substantially in excess of the volume of the air gap, but which is also a minor fraction, twenty-five per cent or less, of the free volume of the drum (i. e., the drum volume minus the rotor volume).

Continuing with particular reference to Figs. 1 through 5, the formed columns which produce the bond are believed to be composed almost entirely of the magnetic material and are believed to bear against the outer surface of the poles of the rotor 2 and against the inner surface of the drum 8. The bearing of the columns so formed against these surfaces apparently sets up a frictional engagement therebetween which opposes relative movement between these column ends and the surfaces with which they are engaged. It is believed that the lower ends of the columns are in addition held magnetically to the spaced poles of the rotor so that a force in addition to the frictional force maintains them to these poles. For example, assume that the magnetic column tends to slide off one edge surface of a pole. As soon as this occurs, the reluctance of the flux path tends to increase and the pillar tends to remain on the pole and to have no relative movement therewith. The resistance to relative movement between the magnetic columns and the inner surface of the drum, however, is believed to be due primarily to the frictional force between the ends of these columns and the inner surface of the drum 8.

These frictional forces, at least within limits, will be proportional to the strength of the magnetic field transmitted through the columns. During synchronous operation these columns appear to be the only driving force between the rotor 2 and the drum 8. Under slip conditions of operation, however, it appears that the pillars no longer engage the drum 8 with sufficient force to cause simultaneous rotation between the rotor 2 and drum 8. Under this operating condition, slipping is believed to occur between the ends of the magnetic columns and the inner surfaces of the drum 8, and possibly between the ends of the columns and the rotor poles; and the drum torque appears to be due, in part, to the sliding engagement and, in part, to the torque produced by eddy currents generated in the drum 8 by the relative movement of the rotor 2 and drum 8. Under this condition of operation, the solid lubricant lubricates the frictional contact between the columns and the surface or surfaces along which slipping occurs, and prevents undue abrasion thereof.

Under other operating conditions, it is desirable to cause the rotor 2 to be de-magnetized so that there is no rotation of the drum 8 by the rotor 2 or, in the case of a drive in the reverse direction through the unit 1, of the rotor 2 by the drum 8. Experiments with the units now being described show that when a powdered dry lubricant is used, as disclosed, the magnetic material columns will immediately collapse and disintegrate to their constituent particles. These particles, and the lubricant particles are somewhat dustlike in character and freely float within the unit 1, more or less as free floating particles which do not tend to adhere together in larger masses or groups and which show no appreciable tendency to form a gummy substance imposing an undesired drag between the rotor and drum. Under such conditions there is no substantial drag imposed by one member on the other member irrespective of which member is driven and the bonding material apparently floats within the unit with no appreciable effect.

It may thus be seen that the presence of this powdered material increases the torque which may be transmitted through a magnetic unit under driving conditions either synchronous or with slip between the rotor 2 and drum 8, and that under no-load or idling conditions, it does not impose an undesirable drag irrespective of whether the rotor 2 or drum 8 is driven. It has been found that by providing proper seals between the rotating parts, the powdered material may be readily retained in the unit 1, and that the units operate efficiently and over long periods of time under severe loading conditions. Even under heavy duty loadings, the breakdown temperatures of the extremely stable constituents of the bonding material are never approached.

Moreover, because of the freedom from frictional drag under unexcited conditions, the internal heat which is developed in the unit is materially reduced. Thus the overall effect of the powdered mixture is to permit of a much smaller unit for any given load and the elimination of special provisions for cooling.

Considering now others of the details of the structure of Figs. 1 through 5, the drive unit 1 provides an enclosed chamber which, except as defined hereinafter, is fluid tight. The unit 1 comprises a rotor 2 suitably secured to a shaft 4 as by means of a key 6 and a drum 8 closely encompassing the periphery of the rotor 2. The drum 8 is rotatably supported upon the shaft 4 by means of spaced bearings 10 and is provided with a sheave or pulley 12 adapted to receive a belt (not shown) for transmitting torque to or from a second sheave or pulley (not shown).

As shown, the shaft 4 is adapted to be rotated by a prime mover (not shown) and the pulley 12 is arranged to be coupled by means of a V-belt to a load (both not shown). In a broader sense, the unit 1 may be driven from a prime mover by means of the pulley 12 in which event the shaft 4 would be connected for driving a driven load. In other instances, one element (i. e., the shaft or pulley) of the unit 1 would be coupled to a nonrotative body, in which case it would serve as a controlled brake.

The rotor 2 comprises a pair of magnetic flux carrying members 14 and 16 having cylindrical hub portions 18 fitted on the shaft 4 and keyed thereto by the aforementioned key 6. The hub portions 18 are arranged in face-to-face relation and are each provided with a plurality of circumferentially spaced radially projecting integral fingerlike arms 20 and 22, respectively, adjacent the opposite end portion of the hub portions 18 which provide a space for receiving an energizable exciting winding 24. The arms 20 and 22 are staggered relative to each other and their end portions are bent at substantially right angles to provide spaced magnetic poles 26 and 28, respectively, separated by substantial air gaps 30. The outer surfaces of the poles 26 and 28 lie along the surface which would be generated by rotating one side of a rectangle around the parallel side as an axis when the axis is at the center of rotation of the shaft 4. The lead wires 32 and 34 of the winding 24 may be brought outwardly of the unit 1 through suitable slip rings and brushes diagrammatically shown in Fig. 2 at 36 and 38.

The drum comprises a cup-shaped element 40 having a continuous sleeve portion 42 which forms the peripheral wall of the element 40 and a radially extending end wall 44 which forms the bottom wall of the element 40. An annular plate-like member 48 extends parallel to the wall 44 and serves to provide an end wall which closes the open end of element 40, being held thereto against a shoulder by means of a snap ring 50. The sleeve portion 42 encompasses the poles 26 and 28 and is separated therefrom by a small air gap 52. The drum base 44 is provided with a central aperture having a flange 54 extending outwardly of the wall 44. The outer race of one of the spaced bearings 10, which is shown as being of the ball antifriction type, may be press-fitted within the inner confines of the flange 54. While such a ball type of bearing is shown, it will be apparent that a roller type, sleeve, or any other usual type of bearing could be used, and the shown construction modified in accordance with the teachings herein to accept such bearing type. The outer surface of the flange 54 is threaded for screw threadedly receiving the pulley 12 whereby it may rotate conjointly with the drum 8. The wall 46 is likewise provided with a flange about its central aperture in which is press-fitted the outer race of the other of the bearings 10.

Felt pads 56 having a metallic outer holding ring 57 are press-fitted into the flanged central apertures of the walls 44 and 46 adjacent the bearings 10. The pads 56 are each provided with a central aperture whereby the felt pads 56 will closely encompass the shaft 4 and prevent air flow between the chamber 3 and the outside of the unit 1 through the bearings 10. In order that the chamber 3 may breathe, the wall 46 is provided with a second aperture 58 connecting the chamber 3 with the outside atmosphere. Held within the aperture 58 is a quantity of filter material 59 such as porous felt, metal, ceramic, paper, etc., so that dust will not be transferred therethrough. To further isolate the magnetic fluid in the region of the chamber 3 adjacent the air gap 52, the drum 8 and rotor 2 may be provided with interfitting annular rings 60 and 62 at both ends of the unit 1. The labyrinth seal 64, so formed, renders it practically impossible for this powdered mixture to escape from the portion of the chamber 3 adjacent the gap 52 but any minute quantities which happen to escape during breathing of the chamber 3 will be prevented from entering the bearings 10 by the pads 56 and from escaping by the filter material 59.

Figures 1, 3:
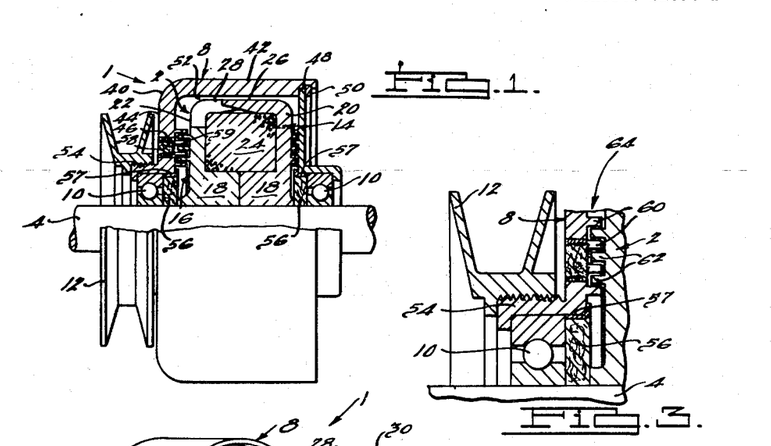
Figure 1 is a view partially in elevation and partially in section, with some of the parts removed for clarity, showing a magnetic clutch embodying the invention.
Fig. 3 is a partial view of the clutch showing means for sealing the clutch interior.
Figure 2:
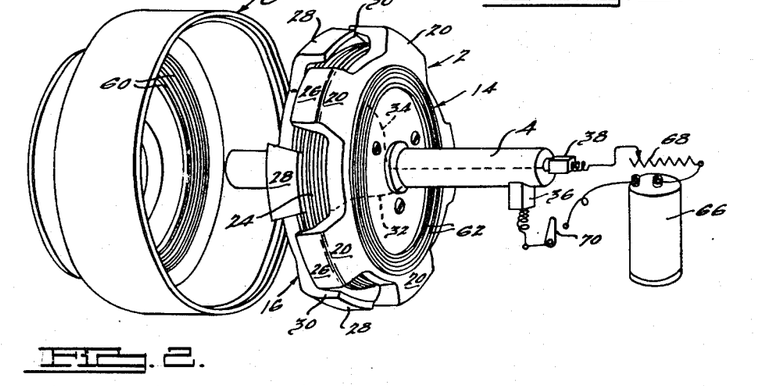
Fig. 2 is an exploded diagrammatic view of the structure of Fig. 1.
Figure 4:
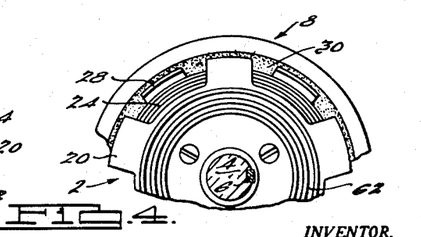
Fig. 4 is a partial sectional view of the clutch showing the herein defined magnetic fluid under non-excited conditions.

The field winding 24 is shown in Fig. 2 as being energized from a battery 66 under control of a rheostat 68 in an obvious manner. It will be apparent that any other form of direct or alternating current energy controlled in a suitable manner could be used. In the case of permanent magnet structures variable fields may be produced within the purview of the invention by, for example, adjustable keepers or the like.

In operation, the shaft 4, for example, is driven from a source of prime energy for driving the rotor 2. With the switch 70 in open-circuit position, very little torque will be imparted to the drum 8 for rotation of the pulley 12 which is coupled to and arranged for driving a load (not shown) through a usual V-belt (not shown). Any torque imparted by the rotor 2 to the drum 8 will be due to the friction of the bearings 10 and to any slight drag due to the presence of the dust in the air gap 52. As stated before, this drag, due to the presence of the powdered material, in the air gap 52, is very slight, so that for all practical effects no drag or torque is applied by the rotating rotor 2 to the now stationary drum 8.

As previously stated, it is preferred to use a quantity of powdered material which exceeds the volume of the small annular air gap which separates the pole ends 26—28 from the immediately adjacent inner surface of the drum 8, but which volume is a minor fraction of the volume of the drum minus the volume of the rotor. Consequently, when the unit is at rest, the material may be expected to collect in a pile near the bottom, but extending part-way up the sides, of the drum. As soon as the drum is started, this collected pile becomes a cloud of dustlike character, the diffusion being due in part to the stirring action of the rotor poles and in part to windage created by the relative motion between the drum and the rotor, either factor being sufficient in itself to create the dustlike diffusion of the powdered mixture. In those cases in which the drum is the driven member, the breaking up of the pile into the dustlike cloud is due to similar considerations, plus the fact that the motion of the drum directly carries the material around with it. In either event, when the unit is in operation, either synchronously or non-sychronously, at least the radially outer part of the free volume of the drum is occupied by the dustlike cloud of powdered mixture, in which cloud the magnetic particles can move substantially freely with respect to the particles of solid lubricant, and as a consequence of which movement the interior surfaces of the unit become coated with a thin protective film of the lubricant. Any lubricant particles which do not adhere to the interior surfaces of the unit appear to move freely as a part of the cloud.

Figure 5:
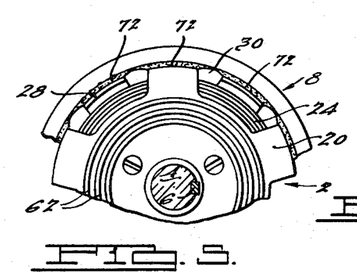
Fig. 5 is a partial view similar to Fig. 4 but showing the magnetic fluid under excited conditions.

When it is desired to energize the unit 1, the switch 70 is closed, causing current to flow from the battery 66 under control of the rheostat 68 through the field winding 24 whereby, depending upon the direction of current flow through the winding 24, north and south poles will be set up on the poles 26 and 28. Due to the substantial air gaps 30 between the poles 26 and 28, magnetic flux will be caused to flow from the north magnetic pole through the air gap 52 into the sleeve portion 42 of the drum 8 and then back through the air gap 52 to one of the adjacent side poles of the rotor 2. As the rotor 2 rotates, this flux, passing through the air gap 52, will rotate relative to the sleeve portion 42, thereby inducing eddy currents therein which oppose relative rotation between the rotor 2 and drum 8, and causing torque to be applied by the rotor 2 to the drum 8 for rotation of the pulley 12 connected to the load as described above. At the same time, the magnetic flux flowing across the air gap 52 will attract magnetic particles into the air gap space and will set up magnetic pillars or columns 72, which, as long as flux is flowing, will be maintained as if the material were a solid rather than a fluid. These columns constitute magnetically-formed mechanical connecting links between the poles of the rotor and the interior surface of the sleeve portion 42 of the drum 8, and bond the drum and rotor together. The magnetic particles of these columns 72 are believed to be held together by the magnetic attraction therebetween, caused by the flux set up by the poles. The ends of the columns appear to bear against the poles of the rotor 2 and the interior surface of the sleeve portion 42 and are held thereagainst due to the magnetic effect. It is believed the magnetic portion of the powdered material will be concentrated somewhat similarly to the showing thereof in Fig. 5. Since, as shown in Fig. 5, the base of the column 72 is substantially coextensive with the bases of the poles 26 and 28, any tendency of the columns to move relative to the poles will be opposed because such relative rotation will tend to increase the reluctance of the magnetic path between the base of such pole and the drum 8.

The outer ends of the columns which bear against the inner surface of the sleeve portion 42 are believed to impart rotative movement to the drum 8 due to the friction effect between the ends of the columns and the adjacent surface of the sleeve portion 42. When the force required to drive the drum 8 is greater than the force required to slip the ends of the columns relative to the drum or the poles, or both, relative rotation will exist between the rotor 2 and drum 8. When this friction force is equal to or greater than the force required to drive the drum 8, the drum 8 will be in effect electro-mechanically coupled, or bonded, to the rotor 2, and synchronous rotation of the rotor 2 and drum 8 is provided. During the perid in which there is relative rotation between the rotor 2 and drum 8, additional torque is applied from the rotor 2 to the drum 8 due to the eddy currents set up in the drum 8 in the usual manner of an eddy-current clutch. The eddy-current torque is, of course, additive to the effect produced by the sliding columns. It is believed that it will be evident that the slipping and locked torques which are transmitted by the unit 1 may be variably controlled by adjusting the magnetic strength of the poles 26 and 28, which adjustment is provided by varying the current flow in the field winding 24 with the rheostat 68.

When it is desired to reduce the lock-up torque of the unit 1, the current flow through the windings 24 is decreased by means of increasing the resistance value of the rheostat 68 whereby the force exerted by the magnetized columns is decreased, thereby reducing the effective mechanical force which may be transmitted by the columns to the drum 8 and allowing the aforesaid slippage.

When it is desired to render the unit 1 ineffective to drive its load, the switch 70 is opened, at which time the forces tending to maintain the columns are eliminated and the columns therefore immediately and completely collapse into substantially dust form whereby they are ineffective to transmit torque from the rotor 2 to the drum 8 and will impose no drag between the rotor and drum. At this time, there will be substantially no magnetic flux from the poles 26 and 28 across the air gap 52 and, therefore, no appreciable eddy currents will be induced in the drum 8. As stated above, any small forces exerted from the rotor 2 to the drum 8 will be due to the friction drag through the bearings 10 and possibly a slight drag caused by the magnetic fluid in the chamber 3, and other windage losses, which drag is insufficient to cause appreciable torque to be applied to the drum 8.

Changes in temperature of the interior of the unit 1 act to change the pressure of the gases therein in accordance with the well-known gas laws whereby there will be a tendency for the chamber 3 to breathe. Such breathing is permitted through the filter material 59 and is, for all practical effects, prevented along the shaft 4 by means of the tightly-fitting felt pads 56.

The provision of the labyrinth seal 64 provides such a highly restricted path between flow of dust particles from the region of the chamber 3 adjacent the air gap 52 through the seal 64 toward the shaft 4 that substantially none of the powdered material finds its way through this labyrinth seal 64 whereby the powdered material is held in the desired region of the chamber 3.

Figure 6:
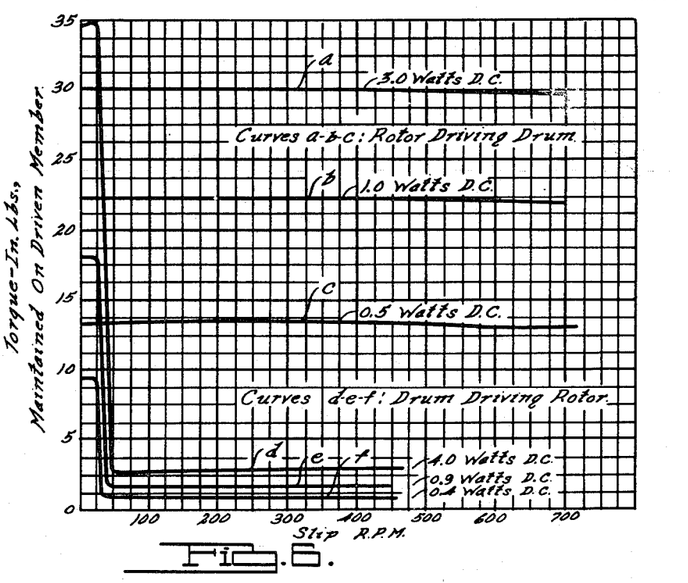
Fig. 6 and 7 are graphs illustrating certain performance characteristics of clutches embodying the invention.

As will be evident from the foregoing discussion, under synchronous or locked-up conditions, the driving and driven relation between the drum and the rotor may be reversed, either member being usable as the driving source or as the driven member. The polarized structure of Figures 1 through 5 has certain valuable operating characteristics, under slip conditions, which, depending upon desired conditions of use, determine which of the elements should serve as the driving or input member. For example, utilizing the rotor 2 as the driving member, the unit will, for a given excitation, maintain a locked-up or synchronous driving relation of a driven member throughout a range of loads up to a certain maximum or break-away value. If the driven load is increased above this break-away value, the torque exerted thereon remains substantially uniform throughout a range of slipping speeds (that is, revolutions of the driving member relative to the driven member). On the other hand, and throughout quite a range of quantities of bonding material, if the drum 8 is used as the input or driving member and the rotor 2 is loaded, a locked or synchronous relation will be maintained up to substantially the same critical or break-away load. If this load is exceeded, the torque exerted on the driven member abruptly falls to and remains at a comparatively low value, throughout a wide range of slipping speeds. Depending upon the choice of the driving member therefor, the unit can be used either to maintain a limiting torque on an overloaded member, or it can be used in such a way that in the event of an overload, the load is immediately released. These actions are illustrated in Figure 6, in which slipping speeds, in R. P. M., are plotted as abscissae, and torques in inch pounds are plotted as ordinates. In this figure, curves a, b and c are plotted for a unit being operated with the rotor 2 as the input or driving member, and represent maximum or break-away torques for different excitations, indicated, respectively, by the legends applied to the respective curves. Curves d, e, and f illustrate the performance of the same unit when the drum is utilized as the driving member, the various excitations being indicated by the legends. It will be noted that in each of curves d, e, and f, increase in the driven load above a certain critical value causes the torque exerted on the load to abruptly fall away to a low value which is a very minor fraction of the breakaway value, which low torque remains substantially uniform throughout a wide range of slipping speeds.

The above overload characteristics appear to result from the fact that when slippage occurs, there is a tendency for the magnetic particles to snowball and be shoveled, so to speak, into the wider air gap spaces 30 which lie between adjacent rotor poles. Any such tendency, of course, increases that part of the magnetic field which bridges these gaps 30 and correspondingly decreases that portion of the magnetic field which flows across the normal air gap 52. This diversion of the magnetic field, of course, reduces the torque on the driven member. If the rotor is being driven, centrifugal force is able to act on the shoveled particles and impel them out of the gaps 30, thereby tending to maintain the torque. The shoveling-in and throwing-out actions, of course, occur concurrently so that the resulting torque is not pulsating in character. On the other hand, if the drum is the driving member, the shoveling-in caused by the initial slippage reduces the torque on the rotor, and is followed by a slowing down of the rotor. The slowing down of the rotor reduces the centrifugal force acting on the particles and is accompanied by an increased shoveling-in action. Consequently, the resultant torque on the rotor falls quickly to a minimum value determined by the magnitudes of the eddy currents, which remain as substantially the only source of driving torque on the rotor.

Since the above overload-release characteristic appears to depend upon a movement of the magnetic particles out of the normal air gap 52 into the spaces between adjacent poles, it will be appreciated that to fully realize the overload-release effect, it is necessary to maintain the volume of bonding material low enough, in relation to the free volume of the drum, to insure that the inter-pole spaces can accommodate the shoveled-in particles. As the volume of bonding material is increased in a unit of given size, a critical volume is reached beyond which the overload-release characteristic is reduced and finally disappears, leaving the unit with much the same overload characteristics as obtained when the rotor is driven.

Figure 7:
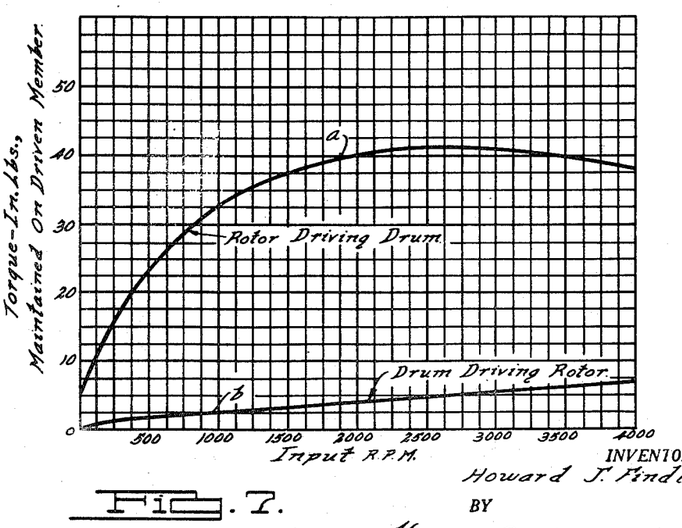

The above-discussed overload characteristics also determine the choice of the driving member, depending upon whether the load is one which is applied to the driven member while the latter is stationary or is one which is applied to it after the driven member is placed in rotation. These characteristics are illustrated in Figure 7 in which input speeds are plotted as abscissae and torques in inch pounds are plotted as ordinates. In this figure, curve a depicts the performance of a unit in which the rotor is the driving member and illustrates the maximum torques available for a given excitation, for different input speeds. With the rotor as the driving member, the illustrated torques are maintained on the driven drum, regardless of whether the loads are applied to the drum while the latter is at rest or after it is in rotation. Curves a and b, on the other hand, collectively illustrate the performance of the same unit when the drum is serving as the driving member. At various input speeds, the torques initially exerted on the rotor, after exciting the winding thereof, are represented by curve a. If the rotor load exceeds the breakaway value, however, the torque abruptly falls away to the value represented by curve b. As in the case of curves d, e, f, of Figure 6, these torques are a minor fraction of the maximum torques which the unit is capable of developing.

Before proceeding to a description of the remaining embodiments, it is noted that the performance curves of Figures 6 and 7 are based upon data obtained with units constructed in accordance with the foregoing description of Figures 1 through 5, which figures are drawn to scale with the exception that the air gap 52 is enlarged in the interest of clarity.

Figures 8, 9, 11:
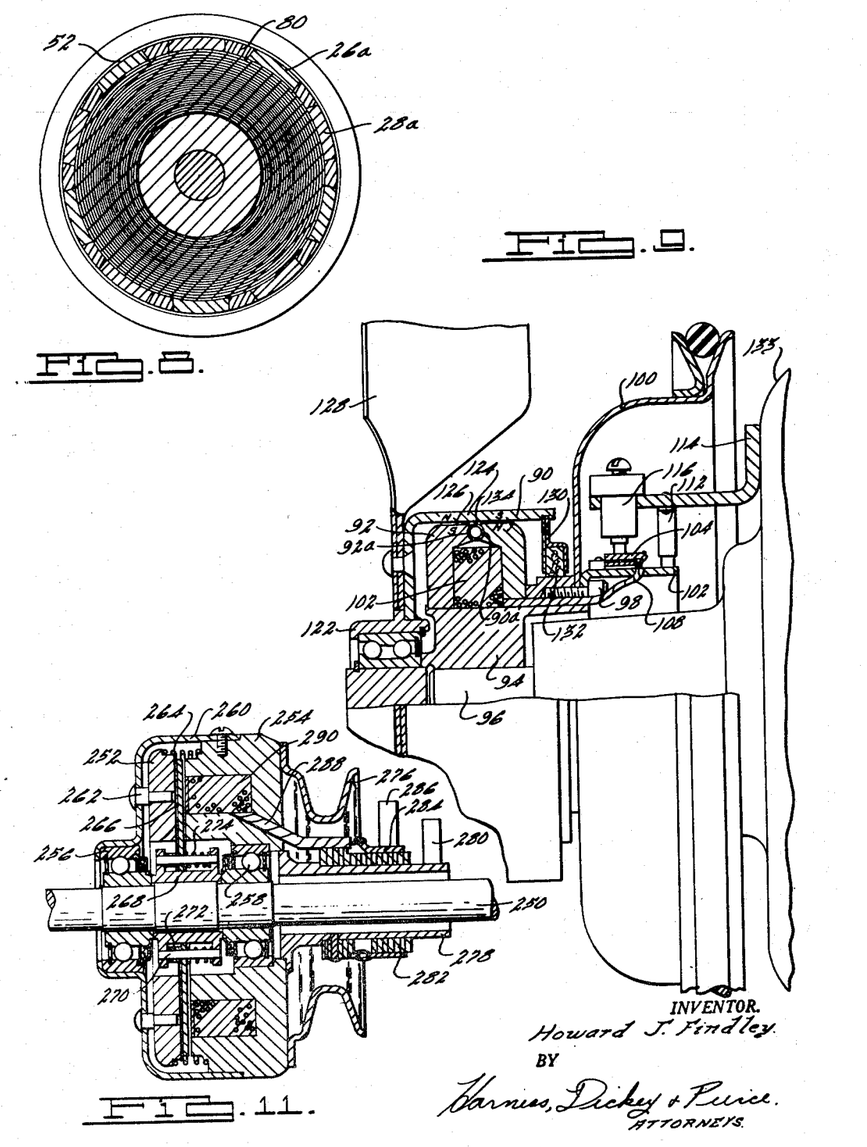

Figure 8 illustrates a structure which may and preferably does, in all respects, including the character and amounts of bonding material, duplicate the structure of Figures 1 through 5, with the exception that the inter-pole spaces 30 of Figures 1 through 5, as well as the corresponding gaps between the pole arms, at the ends of the rotor, are illustrated as having been filled in by a non-magnetic material 80 such as cast aluminum. With this structure, accordingly, the rotor has a smooth outer periphery and substantially uniform or continuous end surfaces. As will be appreciated, the elimination of the gaps between the poles 26a and 28a of Figures 1 through 5 prevents the accumulation of any of the magnetic particles in these previously existing inter-pole spaces. Consequently, the magnetic particles are caused, to better advantage, to occupy the annular air gap 52 and, for given excitations, higher torques are developed. The elimination of the inter-pole spaces also prevents the shoveling-in to these spaces of the magnetic particles, under slip conditions, as described above with reference to Figures 6 and 7. Consequently, the unit of Figure 8 exhibits substantially the same performance characteristics, regardless of whether the drum or the rotor thereof serves as the driving or input member.

The units thus far described exhibit the aforesaid bonding characteristics under both synchronous and slip conditions, and additionally exhibit eddy current characteristics under slip conditions, which eddy current characteristics assist in maintaining a desired torque on the driven member under slip conditions, and also improve the load-picking-up characteristics of the units. For certain applications, the eddy current effects can be reduced or eliminated. Such a unit is illustrated in Figure 9, in which the drum is composed of a pair of cup-shaped oppositely facing members 90 and 92, which are fixed to a skirted hub 94. Hub 94 is keyed or otherwise secured to an input shaft 96. The cup-shaped driving pulley 100 is secured to hub 94 by a plurality of circumferentially distributed studs 98, which also serve to mount the slip ring 102, which carries but is insulated from the companion slip ring 104. The exciting coil 106 is carried by the hub 94 within the chamber space defined by the pole pieces 90 and 92. One terminal (not shown) of the coil 106 is internally connected to the hubs, and is thereby connected through the hub 94 to ring 102. The coil lead 108 is connected to slip ring 104. Brush 112 serves as a grounding connection, and is connected to a stationary mounting bracket 114. The insulated slip ring 108 is engaged by a brush 116 which is insulatedly carried by bracket 114, and which may be connected to the ungrounded side of a suitable source of power, such as a battery. The reduced end portion of hub 94 carries a ball bearing unit 120, the outer race of which is secured to the hub 122 of the driven drum 124. Drum 124 is of cup-shape form, and fits over the rotor structure, leaving as before a relatively small annular air gap 126. As shown, drum 124 carries a fan 128, which may serve as the load. The inner face of drum 124 is closed by a light stamping 130, which also serves as a retainer for a felt or equivalent shaft seal 132.

The illustrated unit is specifically designed to drive the cooling fan 128 of an automobile engine, and shaft 96 is shown as constituting the shaft of a conventional water pump 133, the casing whereof may be suitably and conventionally secured to the front end of the associated engine block (not shown).

Preferably and as illustrated, the space between the rims 90a and 92a of the cup-shaped pole pieces, is closed by a nonmagnetic member 132, illustrated herein as a length of copper tubing, which extends entirely around this gap. Element 134 serves not only to prevent the entry of any of the magnetic mixture into the chamber occupied by the coil, but also serves as a magnetic shield between the opposed edges of the pole pieces 90 and 92.

With this arrangement, it will be appreciated that the rotor structure is of torroidal form and that, for a given direction of current flow through the coil 102, the rim of pole piece 90 may be regarded as a circumferentially continuous north pole and the rim of pole piece 92 may be regarded as a circumferentially continuous south pole. When excited in the just-mentioned relation, coil 102 induces circumferentially continuous north and south poles in the drum, as indicated by the letters N and S in the drawing.

For given excitations of the winding 102, the unit of Figure 9 exhibits magnetic lock-up characteristics very similar to those of the structure of Figures 1 through 5. Under slip conditions, the unit of Figure 9 displays eddy current characteristics, but to a considerably lesser extent than the unit of Figures 1 through 5. The overload performance is like that of Figure 8. The preferred bonding material, including the proportions of the components thereof and the amounts thereof, suitable for use with the structure of Figure 9, is substantially the same as disclosed above in connection with Figures 1 through 5.

In the embodiments of the invention thus far described, it will be noticed that the principal, relatively movable clutch members, i. e., the rotors and drums, are received one within the other, and the air gaps across which the magnetically formed bands are established extend radially outwardly from the outer peripheries of the rotors to the inner peripheries of the drums. In these embodiments, under unexcited conditions, and regardless of which element serves as the driving element, the bonding material is caused to rotate within the free volumes of the drums. Centrifugal force may, consequently, be relied upon to maintain at least a substantial part of the bonding material in, or immediately adjacent, the air gaps, in readiness to establish the bond as soon as the units are excited. In these previously described embodiments, also, the air gaps have been of fixed dimensions.

The remaining herein disclosed embodiments of the invention illustrate the adaptability of the present improvements to structures wherein the principal clutch elements are in axially opposed relation (more specifically, of the plate type), and in which special provision is made to insure that an adequate amount of bonding material is at all times maintained in the space between the opposed clutch surfaces. In these embodiments, this last named feature is accomplished in two ways, which are preferably employed together but which, in the broader aspects of the invention, may individually be relied upon to maintain the bonding material in the said space. Claims specific to structures employing the characteristic axially opposed relation of the principal elements are presented in applicant's copending application, Serial No. 174,229 filed July 17, 1950, as a division hereof.

The first herein illustrated expedient for controlling the positioning of the bonding material comprises generally the provision of circulating passages of such form and arrangement that the bonding material is caused to circulate along a path which includes the space between the opposed clutch surfaces.

The second herein illustrated expedient for controlling the positioning of the bonding material comprises generically an arragement wherein bonding material is caused to adhere to or become a part of the opposed bonding surfaces of one or more of the relatively movable clutch elements. Specifically, as herein illustrated, this adherence is effected magnetically by forming one or more of the opposed bonding surfaces of material which has a substantial amount of magnetic retentivity in consequence of which even under unexcited conditions of the unit, a substantial amount of the bonding material is positively held on the bonding surface or surfaces.

The remaining embodiments also illustrate the adaptability of the present invention to structures employing compound air gaps and air gaps which are increased or decreased, depending upon the unexcited or excited condition of the unit.

Figures 10, 10A, 10B:
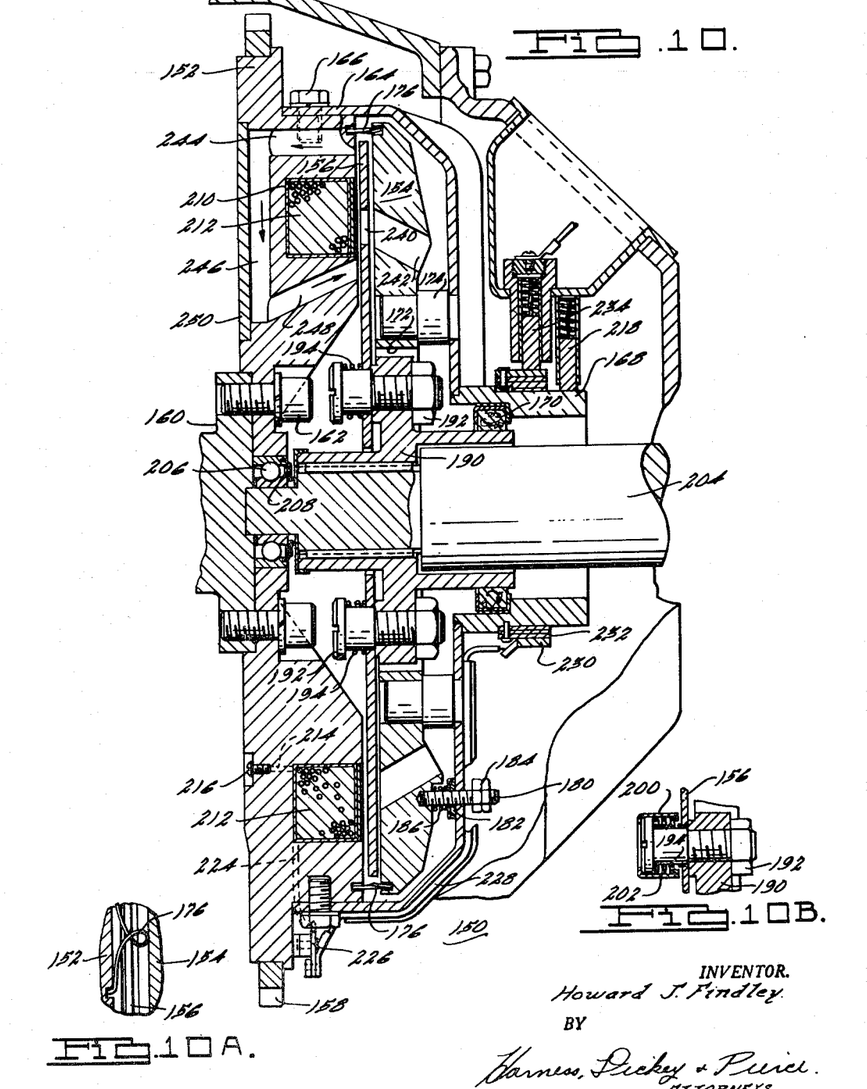
Fig. 10 is a view in axial section of a further modification of the invention wherein the clutch members are, generally speaking, of the plate type.
Fig. 10A is a fragmentary view illustrating a detail of Fig. 10.
Fig. 10B is a fragmentary view illustrating a modified spring structure which may be used in the structure of Fig. 10; and, Fig. 11 is a view in axial section of another form of plate clutch embodying the invention.

Referring now to Figure 10, the illustrated unit 150 is a plate clutch designed specifically for use as the main clutch for an automotive vehicle, and is consequently adapted for connection between the crankshaft and the transmission of such a vehicle. In Figure 10, the clutch comprises a pair of axially spaced and relatively movable driving shoes 152 and 154 which receive between them a driven plate 156. Shoe 152 also constitutes a flywheel, and is shown as carrying a conventional ring gear 158 for cooperation with the usual cranking mechanism (not shown). The outer face of shoe 152 is centrally recessed to accommodate the conventional associated crankshaft flange 160, and these elements are secured together by a plurality of circumferentially distributed studs 162.

Shoe 152 constitutes one side of the enclosing shell for the unit. The other part of the shell is provided by a cup-shaped member 164 which fits over a shoulder provided on the member 152, and is secured in place thereon by a plurality of circumferentially distributed studs 166. Shell member 164 is provided with a cylindrical neck 168, which carries a shaft seal 170 and also, as described below, serves as a slip ring.

The inner shoe 154 is ringlike in structure and has a central aperture 172. Shoe 154 is connected to shell member 164, for rotation therewith, but for axial movement with respect thereto, by a plurality of circumferentially distributed pins 174. Pins 174 are fixed to member 164, and their reduced end portions have sliding fits within apertures provided therefor in shoe 154.

Under unexcited conditions, the illustrated normal spacing is maintained between the shoes 152 and 154 by spring means interposed therebetween and herein illustrated as comprising a plurality of separate hairpinlike elements 176 which are received in annular grooves provided therefor in the faces of the elements 152 and 154. Springs 176 are conventional, and their general nature is indicated in Figure 10A. Under excited conditions, shoe 154 is drawn towards shoe 152. Generically speaking, this axial movement of shoe 154 may be permitted to continue and bring the three clutch elements 152, 156 and 154 into direct face-to-face engagement with each other through the interposed layer of bonding material, proper limits to the engaging pressures being established by properly proportioning the magnetizing field strength relative to the related opposing spring elements. In the preferred practice of the invention, however, a limit is imposed to the axial movement of shoe 154, which maintains it slightly spaced from the plate 156. As shown, these limiting means comprise a series of circumferentially distributed studs 180, which are threaded into tapped openings provided therefor in shoe 154. Studs 180 pass freely through openings provided therefor in the shell member 164, these apertures being sealed by conventional seals 181. Adjustable nuts 184 carried by the studs 180 serve to adjustably limit the axial movement of shoe 154 towards plate 156 and shoe 152. If desired, and as shown, springs 186 may be provided on studs 180. These springs, of course, oppose the action of the hairpin springs 176 but are ineffective to prevent the latter from establishing the normal unexcited shoe spacing shown in the drawing.

The clutch plate 156 is carried by a hub 190, for rotation therewith, but for limited axial movement with respect thereto. More particularly, plate 156 is provided with a series of circumferentially distributed openings, which slidably receive the enlarged body portions of a corresponding series of studs 192, which are threaded into the flange of the hub 190. Springs 194 continuously urge the plate into direct engagement with the face of the hub 190, and normally maintain such engagement. When the unit is excited, plate 156 is magnetically drawn towards the shoe 152 and as shown is caused to directly engage the face thereof, through the interposed layer of bonding material, with a force determined by the ratio between the magnetic effect and the opposing springs 194. When such engagement is permitted, the face pressures are, in accordance with the invention, maintained low enough so as to prevent a breakdown of the lubricating film afforded by the lubricating component of the bonding material. As shown in Figure 10, simple springs 194 are employed. If desired, a compound spring arrangement, as shown in Figure 10B, can be employed, in which view studs 190a are provided with spring cages 200 which receive somewhat heavier springs 202. Cages 200 maintain springs 202 ineffective until just prior to engagement between plate 156 and shoe 152. It will be appreciated that by properly proportioning springs 202, they may serve as stops, to interrupt the movement of plate 156 just prior to engagement with shoe 152, in which event, under excited conditions, small air gaps are maintained between shoe 152 and plate 156, and between plate 156 and shoe 154.

Hub 190 is keyed to the inner reduced end portion of the shaft 204 which, in line with conventional practice, receives bearing support from its associated transmission. Additionally, a pilot bearing 206 is preferably interposed between the inner end of shaft 204 and shoe 152. This latter bearing may be and preferably is provided with a usual shaft seal 208.

Shoe 152 is provided with an annular recess 210 which receives the exciting coil 212. One terminal 214 of coil 212 is electrically connected, as by a stud 216, to the shoe 152. Shoe 152 in turn is connected through casing member 164 and its neck 168 to a grounding brush 218, which is directly electrically connected to ground through bracket 220 and the clutch housing 222.

The other coil lead 224 is brought out to a terminal 226, which is connected through a wire 228 to the slip ring 230. Slip ring 230 is carried by neck 168, but is insulated therefrom by insulating elements 232. Power is brought to ring 230 through brush 234, which may be connected in any suitable manner to the ungrounded terminal of the battery (not shown).

As in the earlier embodiments, different operating conditions determine the optimum proportionings of the magnetic and lubricating components of the powdered bonding material. Generally speaking, the previously specified proportionings of the components of the bonding material is preferred. Similarly, different operating conditions determine the optimum quantities of bonding material in relation to the free volume of the air gap space, or spaces. Generally speaking, the previously indicated volume relations are preferred; namely, a quantity of bonding material which exceeds the volume of the air gap, but which is less than the free volume of the enclosing chamber.

Coming now to the arrangements for insuring the presence in the air gap region of an adequate quantity of the bonding material, plate 156 is provided with a series of circumferentially distributed openings 240, and shoe 154 is provided with a corresponding series of angularly extending openings 242. Preferably, also, the shoe 152 is provided with a circumferentially distributed series of conducting passages defined by interconnecting passage portions 244, 246 and 248. The passages may be formed, as will be understood, by directly drilling the passage portions 244 and 248 so as to communicate with the radially extending portions 246. Portions 246 are closed by plates 250.

As before, rotation of the driving shoes 152 and 154 cause the bonding material to circulate in a cloudlike manner. The angularly directed passages 242 and 248 act as pumps or blowers to draw the bonding material thereinto and cause it to circulate in the air gap spaces at either side of the plate 156. As before, also, this continuous circulation enables the dry-lubricant component of the bonding material to build up a thin but lubricating film on the surfaces of the clutch elements, including the opposed clutching surfaces thereof, thereby adequately protecting these surfaces from any abrasive effect of the circulating magnetic particles. These lubricating surfaces also prevent abrasion of the opposed clutch surfaces when the unit is excited.

As aforesaid, a further and important feature of the invention resides in so arranging the structure that substantial amounts of the bonding material and particularly the magnetic component thereof are positively caused to remain on one or more of the opposed clutching surfaces. In the illustrated embodiment of the invention, this is accomplished by forming the shoes 152 and 154 and, if desired, the plate 156, of magnetic material having a pronounced amount of magnetic retentivity. As an example, both shoes and the plate 156 may be formed of cast iron or steel, the metallurgy of which provides the proper degree of retentivity. As shown, the circulating passages in the shoes are large enough to permit a free movement of the bonding material therethrough, even in view of the magnetic retentivity of these elements, in which event, as disclosed, the entire bodies of shoes 152 and 154 can be formed of the same material. If desired, of course, the bodies of these shoes may be formed of soft iron and they may be provided with opposed faces of the material of higher retentivity. In either arrangement, even under excited conditions, substantial amounts of the magnetic component of the bonding material are magnetically adhered to the opposed clutch faces, and are thus continually in readiness to establish the magnetic bond, as soon as the winding 212 is excited. As previously stated, in the broader aspects of the invention, either the circulating passage arrangement or the retentivity arrangement may be individually relied upon to accomplish the purpose of maintaining a sufficient amount of the bonding material in the gap at all times. Preferably and as illustrated, however, the two expedients are used together.

Summarizing the operation, under excited conditions of the winding 212, the plate 156 remains stationary and shoes 152 and 154 are driven. Under these conditions, the bonding material circulates in cloudlike form, portions thereof being caused by the circulating passages to continually circulate through the air gaps. Other portions of the bonding material are caused by the retentivity of the elements to adhere to the surfaces of the shoes or the plate, or both.

When the winding 212 is excited, the magnetic attraction between the shoes 152 and 154, and, in case plate 156 is formed of magnetic material, between shoe 152 and this plate, causes these elements to move toward each other. In the absence of restraint, direct contact is established therebetween, except to the extent that they are maintained spaced by the interposed film of bonding material. As illustrated, however, shoe 154 is continually spaced from plate 156, and plate 156 engages shoe 152.

In addition to drawing the clutch elements toward each other, as aforesaid, the excitation of winding 212 also causes the magnetic components of the bonding material which are interposed therebetween, to establish the previously identified bond between these elements.

The remaining embodiment shown in Figure 11 corresponds to the embodiment of Figure 10, except in the respects noted below. In Figure 11, the entire unit is carried by a shaft 250, which may be either the input shaft or the output shaft, but is usually the output shaft. Shoes 252 and 254 are rotatably carried by shaft 250 through ball bearing units 256 and 258. As before, shoe 254 constitutes one side of the enclosing housing of the unit and carries a cooperating shell member 260. Shoe 252 is carried by shell 260 for rotation therewith, but for axial movement with respect thereto, by pins 262. Hairpin springs 264 continuously urge the shoes apart and normally maintain the illustrated spacing therebetween.

The clutch plate 266 is carried by a spool-shaped hub 268, which in turn is keyed to the shaft 250. Hub 268 is provided with a series of circumferentially spaced pins 270, which slidably pass through apertures provided therefor in plate 266, and which consequently permit an axial movement of plate 266 with respect to the shoes. Stops 272, carried by the pins 270, normally hold plate 266 out of contact with shoe 252, and springs 274 yieldingly urge the plate against the stops 272.

Shoe 254 carries the pulley 276 which may serve either as an input or an output member but, as stated above, normally serves as the output member of the unit. Additionally, shoe 254 has securely fitted thereto a hub 278 which serves as a slip ring for cooperation with the grounding brush 280, and which also carries through interposed insulation 282 the companion slip ring 284. Slip ring 284 is slidably engaged by brush 286 which may be connected to the ungrounded side of the source of power. As before, slip ring 284 is connected through lead 288 to one terminal of the exciting winding 290. The other terminal of winding 290 is directly connected to the shoe 254, and thence through hub 278 and brush 280 to ground.

In operation, the unit of Figure 11 performs much as does the unit of Figure 10, with the exception that in this instance the magnetic retentivity of shoes 252 and 254 is entirely relied upon to maintain adequate amounts of the bonding material in the air gap. Also, in the arrangement of Figure 11, the shoes and plate directly engage each other except for the interposed layer of bonding material, it being appreciated that the strength of the magnetic field is so related to the opposing forces of the springs that the contact pressures between the opposed clutch surfaces are below those which would cause any breakdown of the lubricating film afforded by the lubricating component of the bonding material. Preferably, the proportionings of the components of the bonding material and the amounts thereof in relation to the free volume of the unit and the volume of the air gap spaces, corresponds to the proportionings and volumes discussed above in connection with Figure 10.

Although only several specific embodiments of the invention have been disclosed in detail, it will be appreciated that the improvements thereof may be embodied in other and widely differing specific structures. The disclosure herein, accordingly, of specific embodiments of the invention is to be taken in an illustrative and not in a limiting sense.

What is claimed is:

1. A coupling device including at least a pair of coupling members mounted for movement relative to each other and having opposed face portions, means adapting one of said members to act as a driving member and adapting the other of said members to apply a driving force to a load, means for establishing a magnetic field between said face portions, and bonding material in said field and responsive thereto for establishing a lubricated load transmitting bond between said surfaces, whereby driving movement of said one member at least tends to cause movement of said other member, said material comprising finely divided magnetic particles and finely divided solid lubricant.

2. A coupling device including at least a pair of coupling members mounted for rotation relative to each other and having opposed face portions, means adapting one of said members to act as a driving member and adapting the other of said members to apply a driving force to a load, means for establishing a magnetic field between said face portions, and bonding material in said field and responsive thereto for establishing a lubricated load transmitting bond between said surfaces whereby rotation of said one member at least tends to cause rotation of said other member, said material comprising finely divided magnetic particles and finely divided solid lubricant.

3. A coupling device including at least a pair of coupling members mounted for rotation relative to each other, said coupling members having opposed face portions at least certain of which are formed of magnetic material, means adapting one of said members to act as a driving member and adapting the other of said members to apply a driving force to a load, means for establishing a magnetic field between said face portions, and bonding material in said field and responsive to said field for establishing a lubricated load transmitting bond between said surfaces, whereby rotation of said one member at least tends to cause rotation of said other member, said material comprising finely divided magnetic particles and finely divided solid lubricant.

4. A coupling device including at least a pair of coupling members mounted for rotation relative to each other and having opposed and spaced face portions, means cooperating with said members to define an enclosing housing for the coupling, means adapting one of said members to act as a driving member and adapting the other of said members to apply a driving force to a load, means for establishing a magnetic field between said face portions, and magnetic material in said field in the space between said face portions and responsive to said field for establishing a lubricating load transmitting bond between said surfaces whereby rotation of said one member at least tends to cause rotation of said other member, said material comprising finely divided magnetic particles and finely divided solid lubricant, the quantity of said material exceeding the volume of said space but being less than that part of the volume of said housing which is not occupied by said members.

5. A coupling device including at least a pair of coupling members mounted for rotation relative to each other and having opposed face portions separated by an air gap, means adapting one of said members to act as a driving member and adapting the other of said members to apply a driving force to a load, means for establishing a magnetic field bridging said gap, and bonding material in said gap and responsive to said field for establishing a lubricated load transmitting bond between said surfaces whereby rotation of said one member at least tends to cause rotation of said other member, said material comprising finely divided magnetic particles and finely divided solid lubricant.

6. A coupling device including at least a pair of coupling members mounted for rotation relative to each other and having opposed face portions spaced to provide an air gap therebetween, means adapting one of said members to act as a driving member and adapting the other of said members to apply a driving force to a load, means cooperating with said members to define an enclosing housing for the coupling, means for establishing a magnetic field bridging said gap, and magnetic material in said gap and responsive to said field for establishing a lubricated load transmitting bond between said surfaces, whereby rotation of said one member at least tends to cause rotation of said other member, said material comprising finely divided magnetic particles and finely divided solid lubricant, the quantity of said material exceeding the volume of said air gap but being less than that part of the volume of said housing which is not occupied by said members.

7. A coupling device including at least a pair of coupling members mounted for rotation relative to each other and having peripheral face portions radially spaced from each other to define an annular space therebetween, means adapting one of said members to act as a driving member and adapting the other of said members to apply a driving force to a load, means for establishing a magnetic field bridging said space, and bonding material in said space and responsive to said field for establishing a lubricated load transmitting bond between said surfaces, whereby rotation of said one member at least tends to cause rotation of said other member, said material comprising finely divided magnetic particles and finely divided solid lubricant.

8. A coupling device including at least a pair of coupling members mounted for rotation relative to each other and having peripheral face portions radially spaced apart to define an air gap therebetween, means adapting one of said members to act as a driving member and adapting the other of said members to apply a driving force to a load, means for establishing a magnetic field bridging said gap, and bonding material in said gap and responsive to said field for establishing a lubricated load transmitting bond between said surfaces, whereby rotation of said one member at least tends to cause rotation of said other member, said material comprising finely divided magnetic particles and finely divided solid lubricant.

9. A coupling device including at least a pair of coupling members mounted for rotation relative to each other and having opposed face portions spaced to provide an air gap therebetween, means adapting one of said members to act as a driving member and adapting the other of said members to apply a driving force to a load, means cooperating with said members to define an enclosing housing for the coupling, means for establishing a magnetic field bridging said gap, and magnetic material in said gap and responsive to said field for establishing a lubricated load transmitting bond between said surfaces, whereby rotation of said one member at least tends to cause rotation of said other member, said material comprising finely divided magnetic particles and finely divided solid lubricant, the quantity of said material exceeding the volume of said air gap but being less than that part of the volume of said housing which is not occupied by said members, said material except for the effect thereon of said field being enabled to circulate in free cloudlike form within said unoccupied part of said housing and said air gap.

10. A coupling device including at least a pair of coupling members mounted for rotation relative to each other and having face portions spaced apart to define an air gap therebetween, said face portions on one said member being formed to define circumferentially successive poles of opposite polarity, said face portions on an adjacent member being included in the magnetic circuit between said poles, means cooperating with said members for establishing said poles and setting up a magnetic field between said face portions, and bonding material in said gap and responsive to said field for establishing a lubricated load transmitting bond between said surfaces, said material comprising finely divided magnetic particles and finely divided solid lubricant.

11. A coupling device including at least a pair of coupling members mounted for rotation relative to each other and having face portions radially spaced apart to define a radially extending air gap therebetween, said face portions on one said member being formed to define at least a pair of axially spaced circumferentially extending poles of opposite polarity, said face portions on an adjacent member being included in the magnetic circuit between said poles, means cooperating with said members for establishing said poles and setting up a magnetic field between said face portions, and bonding material in said gap and responsive to said field for establishing a lubricated load transmitting bond between said surfaces, said material comprising finely divided magnetic particles and finely divided solid lubricant.

12. The structure of claim 1 wherein the magnetic particles in said bonding material are of the order of 8 microns in diameter.

13. The structure of claim 1 wherein the solid lubricant component of said bonding material is in powdered form of the order of 200 mesh.

14. The structure of claim 1, wherein the solid lubricant component of said bonding material comprises at least one lubricant of the group including graphite, mica, soapstone, potstone, steatite, French chalk, and lampblack.

15. The structure of claim 1 wherein said bonding material comprises approximately equal amounts by volume, of finely divided iron and graphite.

HOWARD J. FINDLEY.

REFERENCES CITED

The following references are of record in the file of this patent:

UNITED STATES PATENTS

| Number | Name | Date |
|---|---|---|
| 700,708 | Shoemaker | May 20, 1902 |
| 774,922 | Troy | Nov. 15, 1904 |
| 811,654 | Murphy | Feb. 6, 1906 |
| 1,112,411 | Ackley | Sept. 29, 1914 |
| 1,914,618 | Rudquist | June 20, 1948 |